(12) United States Patent
Huang

(10) Patent No.: US 11,137,845 B2
(45) Date of Patent: Oct. 5, 2021

(54) METHOD AND DEVICE FOR RECOGNIZING CONTACT OF FOLDABLE DISPLAY SCREEN

(71) Applicant: SHANGHAI HARVEST INTELLIGENCE TECHNOLOGY CO., LTD, Shanghai (CN)

(72) Inventor: Jiandong Huang, Shanghai (CN)

( * ) Notice: Subject to any disclaimer, the term of this patent is extended or adjusted under 35 U.S.C. 154(b) by 0 days.

(21) Appl. No.: 16/627,350

(22) PCT Filed: Mar. 20, 2018

(86) PCT No.: PCT/CN2018/079608
§ 371 (c)(1),
(2) Date: Dec. 30, 2019

(87) PCT Pub. No.: WO2019/001029
PCT Pub. Date: Jan. 3, 2019

(65) Prior Publication Data
US 2020/0159355 A1 May 21, 2020

(30) Foreign Application Priority Data

Jun. 29, 2017 (CN) .......................... 201710514071.7

(51) Int. Cl.
*G06F 3/041* (2006.01)
*G06F 1/16* (2006.01)
*G06K 9/00* (2006.01)

(52) U.S. Cl.
CPC .......... *G06F 3/0412* (2013.01); *G06F 1/1652* (2013.01); *G06K 9/00087* (2013.01); *G06F 2203/04102* (2013.01)

(58) Field of Classification Search
CPC ........ G06F 3/041; G06F 3/044; G06F 3/0412; G06F 2203/04103; G06F 3/016; G06F 3/0488; G06F 3/04883; G06F 3/03545; G06F 3/0446; G06F 1/163
See application file for complete search history.

(56) References Cited

U.S. PATENT DOCUMENTS

| | | | | |
|---|---|---|---|---|
| 9,864,567 B2* | 1/2018 | Seo | .................. | G06F 1/1688 |
| 10,503,207 B1* | 12/2019 | Knoppert | .............. | G06F 1/1694 |
| 10,754,390 B2* | 8/2020 | Quinn | ................... | G06F 1/1656 |
| 10,802,549 B2* | 10/2020 | Quinn | ................... | H05K 7/1401 |
| 10,831,346 B2* | 11/2020 | Lu | ....................... | G06F 3/04842 |
| 10,963,156 B2* | 3/2021 | Han | ....................... | G06F 3/013 |
| 2005/0052835 A1* | 3/2005 | Wu | ....................... | G06F 1/1654 |
| | | | | 361/679.04 |

(Continued)

*Primary Examiner* — Olga V Merkoulova

(57) ABSTRACT

Contact recognition method and device for folding display are provided. When first touch surface and second touch surface are in folded state, if it is determined that first touch surface faces current user, since sensing unit is provided under first touch surface, first touch surface can directly capture first contact information of user. When it is determined that second touch surface is facing current user, processing unit projects the touch recognition area and the second touch part that is currently in contact with first touch surface onto second touch surface correspondingly, user can move second touch part so that virtual second touch part on second touch surface is within virtual touch recognition area. In this way, touch recognition area of first touch surface which is facing away from user can obtain second contact information.

23 Claims, 5 Drawing Sheets

(56) References Cited

U.S. PATENT DOCUMENTS

| | | | |
|---|---|---|---|
| 2006/0034042 A1* | 2/2006 | Hisano | G06F 1/1656 |
| | | | 361/679.04 |
| 2009/0244016 A1* | 10/2009 | Casparian | G06F 1/1692 |
| | | | 345/173 |
| 2013/0215041 A1* | 8/2013 | Kim | G06F 3/0346 |
| | | | 345/173 |
| 2013/0265221 A1* | 10/2013 | Lee | G06F 3/038 |
| | | | 345/156 |
| 2014/0015743 A1* | 1/2014 | Seo | G06F 1/3265 |
| | | | 345/156 |
| 2015/0103014 A1* | 4/2015 | Kim | G06F 3/0304 |
| | | | 345/173 |
| 2016/0357221 A1* | 12/2016 | Huh | H04M 1/72569 |

* cited by examiner

METHOD AND DEVICE FOR RECOGNIZING CONTACT OF FOLDABLE DISPLAY SCREEN

BACKGROUND OF THE INVENTION

Field of the Invention

The invention relates to the field of electronic device control, and in particular to a method and device for recognizing a contact on a folding display.

Description of the Prior Art

At present, touch mobile devices, including smartphones, smart tablets, or notebook computers, have been widely used in users' daily life. Since these devices are often accompanied by a large amount of users' information during use, information security protection is particularly important. Among multiple information security methods, fingerprint recognition encryption is one of the significant. Most of the prior art fingerprint recognition technologies still stay at the terminal phase of unlocking the boot screen unlock function. They need to set a dedicate key (such as the home button of the Apple mobile phone) and place a capacitive fingerprint recognition sensor under the button for collecting the fingerprint left by the users on the button. Due to the need to place the capacitive fingerprint recognition sensor, on the one hand, it increases the terminal processing and installation complexity, and on the other hand, it also enhances the thickness of the terminal as a whole, thus limiting the terminal screen development towards thinner, full-screen and rollable applications. Therefore, the development of fingerprint recognition technology embedded in the display screen and operation method thereof, to carry out functions of full-screen display and multi-finger fingerprint recognition can meet the perfect users' experience of the mobile device.

A common feature of such devices is the touch display and current display technologies have rapidly evolved in the direction of flexible displays. Flexible displays have been widely used on folding or rollable mobile devices and provided a completely different look and function compared to today's rigid mobile devices. For example, a folding smartphone expandable into a smart tablet, peered with an external keyboard may become a portable notebook computer, and so forth. By the function of the flexible display screen, the features of the various individual mobile devices can combine into a single device, achieving a lightweight, portable users' experience, for example, as described in U.S. Pat. Nos. 8,804,324, 1,917,535, and so on.

Currently, the display technology includes a liquid crystal display (LCD) screen or an active array organic light-emitting diode (AMOLED) display screen, etc., both of them scan and drive a single pixel through a thin-film transistor (TFT) structure to realize the display function of the on-screen pixel array. The main structure for forming the TFT switching function is a semiconductor field effect transistor (FET), and the well-known semiconductor layer is mainly made of amorphous silicon, polycrystalline silicon, indium gallium zinc oxide (IGZO), or an organic compound mixed with carbon nano materials. Such thin-film transistor devices can be realized on a flexible substrate by high temperature resistant high molecular polymer substrate such as a polyimide film.

Since the structure of a photo diode may also be ready by such semiconductor materials and the production equipment is also compatible with the production equipment of the TFT array, so in recent years the TFT photo diode is produced by the TFT array manufacturing method and is widely used in X-ray sensing flat panel devices, such as those described in the patents CN103829959B and CN102903721B of the People's Republic of China. Compared with the image sensor devices manufactured by the conventional crystalline material, the band gap of the TFT light sensing array film material adopts visible light as the main absorption range, therefore it is more susceptible to interference from ambient visible light to form noise, resulting in a lower signal-to-noise ratio (SNR). Due to this limitation, the initial application of the TFT light sensing array is mainly based on the application of the X-ray sensing flat panel device. The main cause is that the X-ray is a short-wavelength light and the collimation is high. The X-ray image is first incident on the light wavelength conversion material disposed on the sensing panel, and the X-ray image is converted into a longer wavelength visible light and then directly transmitted to the TFT light sensing array film inside the sensing panel, thereby avoiding the noise interference caused by ambient visible light, such as those described in the above-mentioned patents CN103829959B and CN102903721B of the People's Republic of China.

If the well-known TFT visible light sensing array film manufactured on a flexible substrate and disposed in the structure of the flexible display, it can be used as a technology for integrating the light-sensing functions into the flexible display, According to the theory of light wave, the original image calculated and reconstructed to realize the fingerprint recognition in the folding display. However, due to cost considerations, the photodiode film, being a fingerprint recognition device, is not disposed over the entire screen of the folding display. Taking the application of the dual-screen folding display as an example, if the double screen of the mobile device is facing out in the earlier used, when the users pick up the mobile device and starts up again, only the back display facing the outside (the other side compared to the human eye) has an on-screen fingerprint recognition device, the users still need to flip the mobile device and look for the fingerprint recognition area indicated by the display screen then press to complete identity recognition. It is unable to improve the users' experience of fingerprint recognition on the folding full screen. Also, the convenience of multi-finger fingerprint recognition operation in the display is limited.

SUMMARY OF THE INVENTION

A technical problem to be solved by the present invention is to provide a technical solution for contact recognition of a folding display, in order to solve the problems such as the inconvenience of multi-fingerprint fingerprint operation of the under-screen fingerprint recognition device after folding, folding mobile device with full-screen fingerprint recognition device leading to high installation cost, and poor user interaction experience.

In order to solve the above technical problems, the technical solution adopted by the present invention is a device for recognizing a contact on a folding display, the device includes a first display panel and a second display panel. The first display panel includes a first touch surface, and the second display panel includes a second touch surface. The first touch surface and the second touch surface is configured to switch between a folded state of being opposite to each other and an unfolded state. A contact recognition area is provided on the first touch surface, a sensing unit is provided under the contact recognition area, and the sensing unit is configured to capture a user's contact information. The device includes a contact information preset unit, a processing unit, and a determining unit. The determining unit includes a first determining unit and a second determining unit.

The contact information preset unit is configured to preset a correspondence relationship between a preset contact information and an operation instruction, and the preset contact information includes a first preset contact information and a second preset contact information.

When the first touch surface and the second touch surface are in a folded state, and the first touch surface and the second touch surface are disposed outward, the first determining unit is configured to determine whether the first touch surface or the second touch surface is facing a current user.

If it is determined that the first touch surface is facing the current user, the sensing unit is configured to capture a first contact information of a first touch part in the contact recognition area. The first determining unit is configured to determine whether the captured first contact information matches the first preset contact information. If it matches, the processing unit is configured to execute the operation instruction corresponding to the first preset contact information. If it does not match, the processing unit does not execute the operation instruction corresponding to the first preset contact information.

If it is determined that second touch surface is facing the current user, the processing unit is configured to control the second touch surface to display a virtual second touch part and a virtual contact recognition area. A display position of the virtual contact recognition area on the second touch surface is corresponding to a display position of the contact recognition area on the first touch surface, a display position of the virtual second touch part on the second touch surface is corresponding to a current position of the first touch part on the first touch surface.

When the virtual second touch part is located in the virtual contact recognition area, the sensing unit is configured to capture a second contact information of the second touch part in the touch recognition area. The second determining unit is configured to determine whether the captured second contact information matches the second preset contact information. If it matches, the processing unit is configured to execute an operation instruction corresponding to the second preset contact information. If it does not match, the processing unit does not execute the operation instruction corresponding to the second preset contact information.

In addition, the device includes an operation instruction receiving unit, and the contact information preset unit configured to preset a correspondence relationship between a preset contact information and an operation instruction includes: the operation instruction receiving unit configured to receive the user's setting instruction, and the first display panel configured to display the contact recognition area; the sensing unit configured to capture and save contact information of the user on the contact recognition area; the first display panel or the second display panel configured to display an operation instruction identification list, the operation instruction identification list including one or more identifications corresponding to operation instructions, and each operation instruction identification corresponding to an operation instruction; the operation instruction receiving unit further configured to receive selection instruction of the user for the operation instruction identification, and establish and save the correspondence relationship between the operation instruction corresponding to the selected operation instruction identification and the contact information captured by the sensing unit.

In addition, the operation instruction includes one or more of system startup instructions, text operation instructions, image operation instructions, video operation instructions, and application operation instructions.

In addition, the first determining unit configured to determine whether the first touch surface is facing a current user includes the first determining unit configured to determine whether the current sensing unit has captured the user's feature information, and if yes, it is determined that the first touch surface faces the current user, otherwise it is determined that the second touch surface faces the current user.

In addition, the feature information includes one or more of face feature information, fingerprint feature information, human ear feature information, and lip feature information.

In addition, the first determining unit configured to determine whether the first touch surface is facing the current user includes the first determining unit configured to determine whether the ambient light intensity sensed by the current sensing unit is lower than a preset light intensity, and if yes, it is determined that the second touch surface is facing the current user, otherwise it is determined that the first touch surface is facing the current user.

In addition, the first determining unit configured to determine whether the first touch surface is facing the current user comprises the first determining unit configured to determine whether the detected number of contacts on the first touch surface is greater than a preset number of contacts, and if yes, it is determined that the second touch surface is facing the current user, otherwise it is determined that the first touch surface is facing the current user.

In addition, the current number of contacts on the first touch surface is detected by the sensing unit or the touch panel of the first display panel.

In addition, the first contact information or the second contact information is fingerprint information; the first determining unit configured to determine whether the captured first contact information matches the first preset contact information comprises the first determining unit configured to calculate a feature value of the first contact information captured by the sensing unit, and compare the feature value with the first preset contact information; when the error is less than a preset error, it is determined as a match, otherwise it is determined as a mismatch; furthermore, the second determining unit configured to determine whether the captured second contact information matches the second preset contact information comprises the second determining unit configured to calculate a feature value of the second contact information captured by the sensing unit, and compare the feature value with the second preset contact information; when the error is less than the preset error, it is determined as a match, otherwise it is determined as a mismatch.

In addition, the processing unit is further configured to generate a prompt message determine when the second determination unit determines that the first contact information does not match the first preset contact information, or the second contact information does not match the second preset contact information.

In addition, the prompt information comprises one or more of sound prompt information, image prompt information, light prompt information, and video prompt information.

In addition, the device includes more than two touch surfaces; when the first touch surface and the second touch surface are in a folded state, one or more other touch surfaces are also folded between the first touch surface and the second touch surface.

In addition, the sensing unit comprises a TFT image sensing array film.

In addition, the first display panel or the second display panel is a display panel using active array thin film transistors for scan driving and transmitting data, and comprises an AMOLED display, a liquid crystal display, a micro light emitting diode display, a quantum dot display, or an electronic ink display.

In addition, the first display panel is an liquid crystal display or an electronic ink display, a backlight unit is disposed under the sensing unit, and the sensing unit is disposed between the backlight unit and the liquid crystal display, or disposed between the backlight unit and the electronic ink display.

In addition, when the first display panel is an LCD liquid crystal display or an electronic ink display, the TFT image sensing array film comprises an infrared sensing layer, and the infrared sensing layer is an array formed by infrared photodiodes or infrared phototransistors.

In addition, the contact recognition area includes a plurality of contact recognition sub-areas, and a sensing unit is disposed corresponding to each of the contact recognition sub-areas.

In addition, the device further includes an operation instruction receiving unit and a sensing unit control circuit, the operation instruction receiving unit is configured to receive an instruction of the user for starting the contact recognition sub-area, and the sensing unit control circuit is configured to turn on the sensing unit under the contact recognition sub-area; the operation instruction receiving unit is also configured to receive another instruction of the user for closing the contact recognition sub-area, the sensing unit control circuit is configured to turn off the sensing unit under the contact recognition sub-area.

The inventor also provides a method for recognizing a contact on a folding display, and the method is applied to a device for recognizing a contact on a folding display. The device includes a first display panel and a second display panel, and the first display panel includes a first touch surface, and the second display panel includes a second touch surface. The first touch surface and the second touch surface is configured to switch between a folded state of being opposite to each other and an unfolded state. A contact recognition area is provided on the first touch surface, a sensing unit is provided under the contact recognition area, and the sensing unit is configured to capture a user's contact information. The device includes a contact information preset unit, a processing unit, and a determining unit. The determining unit includes a first determining unit and a second determining unit. The method includes:

the contact information preset unit presets a correspondence relationship between a preset contact information and an operation instruction, and the preset contact information comprises a first preset contact information and a second preset contact information;

when the first touch surface and the second touch surface are in a folded state, and the first touch surface and the second touch surface are disposed outward, the method further comprises:

the first determining unit determines whether the first touch surface is facing a current user;

if it is determined that the first touch surface is facing the current user, the sensing unit captures a first contact information of a first touch part in the contact recognition area;

the second determining unit determines whether the captured first contact information matches the first preset contact information, if it matches, the processing unit executes the operation instruction corresponding to the first preset contact information, if it does not match, the processing unit does not execute the operation instruction corresponding to the first preset contact information;

if it is determined that second touch surface is facing the current user, the processing unit controls the second touch surface to display a virtual second touch part and a virtual contact recognition area, a display position of the virtual contact recognition area on the second touch surface is corresponding to a display position of the contact recognition area on the first touch surface, a display position of the virtual second touch part on the second touch surface is corresponding to a current position of the second touch part on the first touch surface;

when the virtual second touch part is located in the virtual contact recognition area, the sensing unit captures a second contact information of the second touch part in the touch recognition area, the second determining units determines whether the captured second contact information matches the second preset contact information, if it matches, the processing unit executes an operation instruction corresponding to the second preset contact information, if it does not match, the processing unit does not execute the operation instruction corresponding to the second preset contact information.

In addition, the device includes an operation instruction receiving unit, and the contact information preset unit presetting a correspondence relationship between a preset contact information and an operation instruction includes:

the operation instruction receiving unit receiving the user's setting instruction, and the first display panel displaying the contact recognition area; the sensing unit capturing and saving contact information of the user on the contact recognition area; the first display panel or the second display panel displaying an operation instruction identification list, the operation instruction identification list comprising one or more identifications corresponding to operation instructions, and each operation instruction identification corresponding to an operation instruction; the operation instruction receiving unit further receiving selection instruction of the user for the operation instruction identification, and establishing and saving the correspondence relationship between the operation instruction corresponding to the selected operation instruction identification and the contact information captured by the sensing unit.

In addition, the operation instruction includes one or more of system startup instructions, text operation instructions, image operation instructions, video operation instructions, and application operation instructions.

In addition, the first determining unit determining whether the first touch surface is facing a current user includes the first determining unit determining whether the current sensing unit has captured the user's feature information, and if yes, it is determined that the first touch surface faces the current user, otherwise it is determined that the second touch surface faces the current user.

In addition, the feature information includes one or more of face feature information, fingerprint feature information, human ear feature information, and lip feature information.

In addition, the first determining unit determining whether the first touch surface is facing the current user includes the first determining unit determining whether the ambient light intensity sensed by the current sensing unit is lower than a preset light intensity, and if yes, it is determined that the second touch surface is facing the current user, otherwise it is determined that the first touch surface is facing the current user.

In addition, the first determining unit determining whether the first touch surface is facing the current user comprises the first determining unit determining whether the detected number of contacts on the first touch surface is greater than a preset number of contacts, and if yes, it is determined that the second touch surface is facing the current user, otherwise it is determined that the first touch surface is facing the current user.

In addition, the current number of contacts on the first touch surface is detected by the sensing unit or the touch panel of the first display panel.

In addition, the first contact information or the second contact information is fingerprint information; the second determining unit determining whether the captured first contact information matches the first preset contact information comprises the second determining unit calculating a feature value of the first contact information captured by the sensing unit, and comparing the feature value with the first preset contact information; when the error is less than a preset error, it is determined as a match, otherwise it is determined as a mismatch; furthermore, the second determining unit determining whether the captured second contact information matches the second preset contact information comprises the second determining unit calculating a feature value of the second contact information captured by the sensing unit, and comparing the feature value with the second preset contact information; when the error is less than the preset error, it is determined as a match, otherwise it is determined as a mismatch.

In addition, the method further includes the processing unit generating a prompt message when the second determination unit determines that the first contact information does not match the first preset contact information, or the second contact information does not match the second preset contact information.

In addition, the prompt information comprises one or more of sound prompt information, image prompt information, light prompt information, and video prompt information.

In addition, the device includes more than two touch surfaces; when the first touch surface and the second touch surface are in the folded state, one or more other touch surfaces are also folded between the first touch surface and the second touch surface.

In addition, the sensing unit comprises a TFT image sensing array film.

In addition, the first display panel or the second display panel is a display panel using active array thin film transistors for scan driving and transmitting data, and comprises an AMOLED display, a liquid crystal display, a micro light emitting diode display, a quantum dot display, or an electronic ink display.

In addition, the first display panel is an liquid crystal display or an electronic ink display, a backlight unit is disposed under the sensing unit, and the sensing unit is disposed between the backlight unit and the liquid crystal display, or disposed between the backlight unit and the electronic ink display.

In addition, when the first display panel is an LCD liquid crystal display or an electronic ink display, the TFT image sensing array film comprises an infrared sensing layer, and the infrared sensing layer is an array formed by infrared photodiodes or infrared phototransistors.

In addition, the contact recognition area includes a plurality of contact recognition sub-areas, and a sensing unit is disposed corresponding to each of the contact recognition sub-areas.

In addition, the device further comprises an operation instruction receiving unit and a sensing unit control circuit, the method further comprises: the operation instruction receiving unit receiving an instruction of the user for starting the contact recognition sub-area, and the sensing unit control circuit turning on the sensing unit under the contact recognition sub-area; and the operation instruction receiving unit receiving another instruction of the user for closing the contact recognition sub-area, and the sensing unit control circuit turning off the sensing unit under the contact recognition sub-area.

The advantages after adopting the above technical solutions are: when the first touch surface and the second touch surface are in the folded state, both the first touch surface and the second touch surface are facing outward, if it is determined that the first touch surface faces the current user, since a sensing unit is provided under the first touch surface, when the sensing unit receives the first contact information that matches the preset contact information, it executes a corresponding operation. When it is determined that the second touch surface is facing the current user and the first touch surface is facing away from the current user, the processing unit projects the second touch part that is currently in contact with the first touch surface and the touch recognition area onto the second touch surface correspondingly, the user can move the second touch part so that the virtual second touch part on the second touch surface is within the virtual touch recognition area. In this way, the touch recognition area of the first touch surface which is facing away from the user can obtain the second contact information. When the received second contact information matches the preset contact information, a corresponding operation is performed. The invention can solve the problems such as the inconvenience of multi-fingerprint operation of the in-display or under-display fingerprint recognition device in the folding state, reduce installation cost of configuring folding mobile device with full-screen fingerprint recognition device and improve the security encryption quality of the folding mobile device application to achieve a thin and full-screen user experience of the human-computer interaction interface, and can simultaneously meet the multiple requirements of user's privacy and experience.

DESCRIPTION OF THE PREFERRED EMBODIMENTS

Technical contents, structural features, implemented objectives and effects of the present disclosure will be described in detail below in combination with embodiments and with reference to the accompanying drawings.

Figure 3:
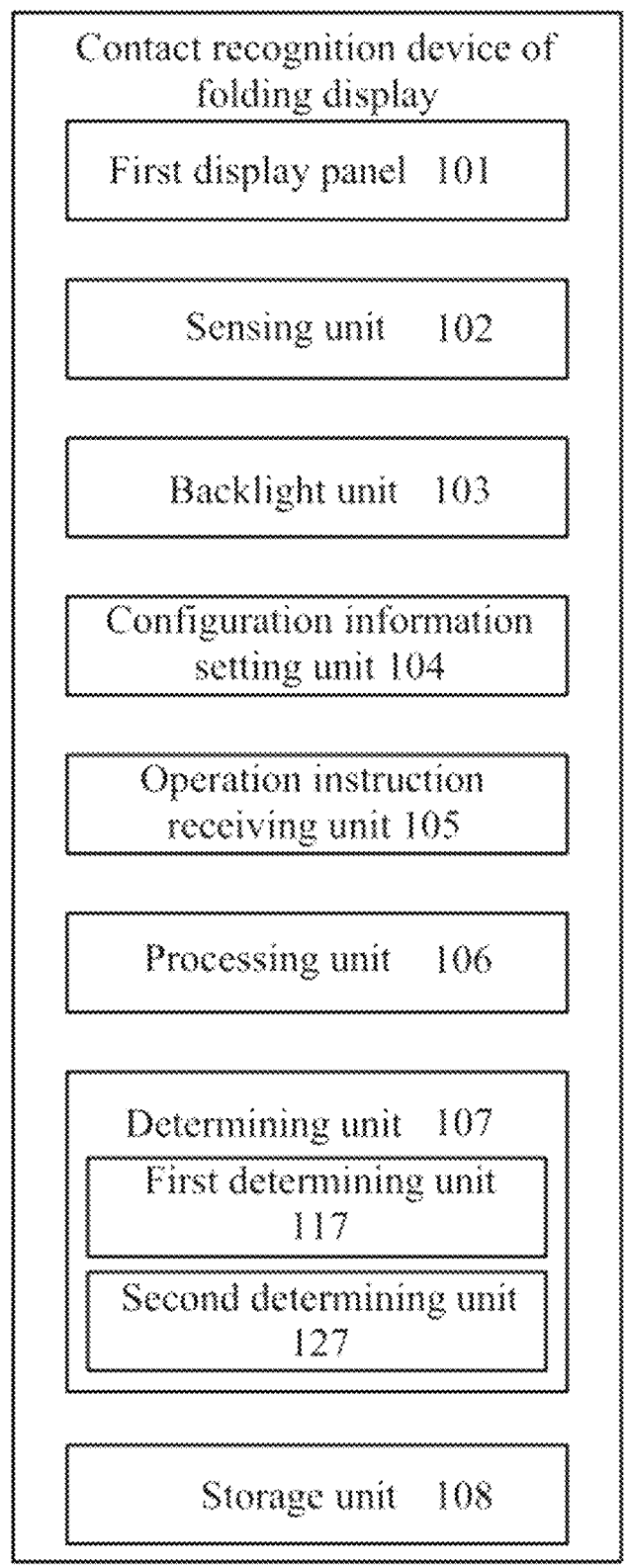
FIG. 3 is a schematic diagram of a contact recognition device of a folding display according to an embodiment of the present disclosure.

Please refer to FIG. 3, which is a schematic diagram of a contact recognition device of a folding display according to an embodiment of the present disclosure. The device is an electronic device having more than two folding display panels, such as a mobile phone, a tablet computer, a personal digital assistant, or other smart mobile device with a flexible display panel.

The device includes a first display panel 101 and a second display panel 111, the first display panel 101 includes a first touch surface, and the second display panel 111 includes a second touch surface. The first touch surface and the second touch surface are configured to be switched between a state of being folded opposite to each other or another state of being unfolded. A contact recognition area is provided on the first touch surface, a sensing unit 102 is provided under the contact recognition area, and the sensing unit 102 is configured to capture a user's contact information. The device includes a contact information preset unit 104, a processing unit 106, and a determining unit 107. The determining unit 107 includes a first determining unit 117 and a second determining unit 127.

The contact information preset unit 104 is configured to preset a correspondence relationship between a preset contact information and an operation instruction, and the preset contact information includes a first preset contact information and a second preset contact information. The contact information is information input after the touch part contacts the display panel, and the touch part is such as a part of a human body, such as a finger. The preset contact information is the contact information entered by the user in advance. Each contact information can be associated with an operation instruction. Each operation instruction can correspond to multiple contact information, that is, when any one of these contact information is received, the corresponding operation instruction can be triggered. The correspondence relationship between the preset contact information and the operation instruction is such as stored in the storage unit 108 of the device, for example: a memory of a mobile phone, a hard disk of a computer, or such as stored in a storage unit of a server. When it is necessary to obtain the correspondence relationship between the preset contact information and the operation instruction, only make the device establish a communication connection with the server, and then the device can obtain it from the server. The communication connection includes a wired communication connection or a wireless communication connection.

Generally, each display panel in a folding display has a touch surface and a non-touch surface (the back of the display panel), so that the folding display has two forms when it is in a folded state. Taking a dual-monitor (with two display panels) display as an example, when the first touch surface of the first display panel and the second touch surface of the second display panel face each other, the folded display is in an unused state. When the first touch surface of the first display panel and the second touch surface of the second display panel are folded back to back and attached, both the first touch surface and the second touch surface are disposed outward. Because only the first display panel is provided with a sensing unit, when the second touch surface is facing the user, the user needs to in advance flip the display screen in this state so that the first touch surface faces the user. Thus, the user can input the first contact information on the first touch surface, and then perform a corresponding operation (such as an unlock operation). This brings a bad experience to users, and to solve this problem, the first determining unit 117 is configured to determine whether the first touch surface is facing the current user when the first touch surface and the second touch surface are in a folded state, and the first touch surface and the second touch surface are disposed outward (hereinafter referred to as "folded use state").

If it is determined that the first touch surface is facing the current user, the sensing unit 102 is configured to capture a first contact information of a first touch part in the contact recognition area; the first determining unit 117 is configured to determine whether the captured first contact information matches the first preset contact information, if it matches, the processing unit 106 is configured to execute the operation instruction corresponding to the first preset contact information, if it does not match, the processing unit 106 does not execute the operation instruction corresponding to the first preset contact information. The first contact information is contact information input after the first touch part contacts the first touch surface. In the folded use state, when the first touch surface faces the current user, since the first display panel is provided with a sensing unit, the user can directly input the first contact information on the sensing unit.

If it is determined that second touch surface is facing the current user, the processing unit is configured to control the second touch surface to display a virtual second touch part and a virtual contact recognition area, a display position of the virtual contact recognition area on the second touch surface is corresponding to a display position of the contact recognition area on the first touch surface, a display position of the virtual second touch part on the second touch surface is corresponding to a current position of the second touch part on the first touch surface. In the folded use state, when the second touch surface faces the current user, since the second display panel is not provided with the sensing unit, the contact information input by the user on the second touch surface cannot be recognized by the sensing unit below.

Because the position of the virtual second touch part on the second touch surface corresponds to the position of the real second touch part on the first touch surface, that is, the real second touch part moves, the display position of the virtual second touch part on the second touch surface also moves correspondingly. Therefore, when the virtual second touch part is located in the virtual contact recognition area (indicating that the real second touch part is in the touch recognition area at this time), the sensing unit 102 is configured to capture second contact information of the second touch part in the contact recognition area, The second determining unit 127 is configured to determine whether the captured second contact information matches the second preset contact information. If it matches, the processing unit 106 is configured to execute an operation instruction corresponding to the second preset contact information. If it does not match, the processing unit 106 does not execute an operation instruction corresponding to the second preset contact information.

In the following, take the touch section as a user's finger, the contact information as fingerprint information, and the contact recognition area as a rectangular area located at the center of the first touch surface as examples to further describe the solution of this embodiment. Generally, when using the terminal, the user will hold the mobile phone with one hand (such as the right hand) and unlock the fingerprint with his thumb. The first contact information is such as the fingerprint information of the thumb of the right hand, and the second contact information is such as the fingerprint information of one or more of the four fingers of the right hand except the thumb. When the device is in the folded use state, and the first determining unit detects that the first touch surface is facing the user (that is, the first touch surface is aligned with the human eye), because the sensing unit is provided under the first touch surface, after holding the mobile phone, the user can press the contact recognition area with the thumb of the right hand, so that the sensing unit receives the fingerprint information of the thumb, and then completes the unlock operation after the fingerprint information matches. When the device is in the folded use state, and the first determining unit detects that the second touch surface faces the user (that is, the first touch surface faces away from the human eye), one or more of the four fingers of the user's right hand except the thumb are contacted with the first touch surface, but because the first touch surface faces away from the user's eyes, the user cannot accurately move one of the other four fingers (such as the ring finger) into the contact recognition area. Therefore, the processing unit controls the display of the virtual four fingers (or virtual ring finger) and the virtual contact recognition area on the second touch surface. Since the second touch surface faces the user's eye, the user can easily move the virtual second touch part to the virtual contact recognition area (specifically, it can be achieved by moving the real second touch part on the first touch surface). Taking the second touch part as the right ring finger as an example, when the virtual ring finger is located in the virtual contact recognition area, indicating the right hand ring finger in contact with the first touch surface has also moved to the contact recognition area, the sensing unit can capture the fingerprint information on the ring finger of the right hand, and then compare it with the preset fingerprint information, and complete the unlock operation after the comparison. Through the above solution, when the device is in the folded display state, whether the first touch surface or the second touch surface is facing the user, the user can perform the contact recognition operation without turning the device, which simplifies the user operation process and greatly improves the user's experience.

In some embodiments, the device includes an operation instruction receiving unit 105, and "the contact information preset unit is configured to preset a correspondence relationship between a preset contact information and an operation instruction" includes:

The operation instruction receiving unit is configured to receive a user's setting instruction, and the first display panel is configured to display the contact recognition area. The setting instruction is triggered by the user clicking a button in a setting bar on the screen. After receiving the setting instruction, the device will display the contact recognition area, so that the user can places the touch section in the contact recognition area for the sensing unit to capture the contact information. In this embodiment, displaying the contact recognition area may include increasing the brightness of the contact recognition area or displaying a prompt input box on the contact recognition area. In some embodiments, before receiving the user's setting instruction, receiving account information of the user is performed and the account information includes a user ID and a password. The user needs to input the correct user ID and password by means of voice control, eyeball control, or key password control, and only after logging in to the user account can the setting instruction be triggered. In this way, the security of setting touch configuration information (that is, the correspondence between the preset contact information and the operation instructions) is improved on the one hand, and on the other hand, the effect of distinguishing different users and saving different touch configuration information on one device is achieved.

The sensing unit is configured to capture and save contact information of the user on the contact recognition area. In this embodiment, the device includes a storage unit. The processing unit is further configured to determine whether the captured contact information has been stored in a storage unit. When the determination is yes, the user is prompted that the contact information is entered; when the determination is no, the contact information is saved to the storage unit. This can effectively avoid repeated entry of feature information.

The first display panel or the second display panel is configured to display an operation instruction identification list, The operation instruction receiving unit is further configured to receive a user's selection instruction for the operation instruction identification, and establish and save the correspondence relationship between the operation instruction corresponding to the selected operation instruction identification and the contact information captured by the sensing unit. The operation instruction identification list includes one or more identifications corresponding to operation instructions, and each operation instruction identification corresponds to an operation instruction. The selection instruction is such as triggered by the user's clicking to check, double-clicking, and the like.

In some embodiment, the operation instruction includes one or more of system startup instructions, text operation instructions, image operation instructions, video operation instructions, and application operation instructions. The system startup instruction includes a startup instruction. The text operation instructions include instructions for sharing, forwarding, adding, deleting, and modifying text. The image operation instructions include instructions for sharing, forwarding, adding, deleting, and modifying images. The video operation instructions include instructions for sharing, forwarding, adding, deleting, and modifying videos. The application operation instruction includes instructions for opening, deleting, and moving the application program. In short, the type of operation instruction can be set according to the actual needs of the user. The user can encrypt the opening of some key information or the startup of the application by setting the contact information to improve the security of information storage In some embodiment, "the first determining unit is configured to determine whether the first touch surface is facing a current user" includes the first determining unit configured to determine whether the current sensing unit has captured the user's feature information, and if yes, it is determined that the first touch surface faces the current user, otherwise it is determined that the second touch surface faces the current user. In addition, the feature information includes one or more of face feature information, fingerprint feature information, human ear feature information, and lip feature information. Taking the face feature information as an example, the face feature information is face contour information. When the user aligns the human face with the first touch surface, the sensing unit under the touch surface captures the face contour information, so as to determine that the first touch surface faces the current user.

In some embodiment, "the first determining unit is configured to determine whether the first touch surface is facing a current user" includes the first determining unit configured to determine whether the ambient light intensity sensed by the current sensing unit is lower than a preset light intensity, and if yes, it is determined that the second touch surface is facing the current user, otherwise it is determined that the first touch surface is facing the current user. Taking the contact information as fingerprint information as an example, when the user holds a mobile terminal in a folded use state with his hand, if the first touch surface faces away from the user, it is blocked by the user's palm, and its perceived ambient light intensity is weaker than that when the first touch surface is facing the user. Therefore, it can be determined whether the current first touch surface is facing the user by detecting the ambient light intensity sensed by the sensing unit. The preset light intensity is a certain value, which can be set according to actual needs.

In some embodiment, "the first determining unit is configured to determine whether the first touch surface is facing a current user" includes the first determining unit configured to determine whether the detected number of contacts on the first touch surface is greater than a preset number of contacts, and if yes, it is determined that the second touch surface is facing the current user, otherwise it is determined that the first touch surface is facing the current user. Taking the contact information as fingerprint information as an example, when a user holds a mobile terminal in the folded use state with his hand, if the first touch surface faces away from the user, then there will be more than two fingers (that is, the touch part) contacting the first touch surface. Therefore, it can be determined whether the first touch surface is facing the user by detecting the current number of contacts on the first touch surface. In some embodiment, the current number of contacts on the first touch surface is detected by the sensing unit or the touch panel of the first display panel.

In short, there are many ways to "determine whether the first touch surface is facing the current user", which can be specifically determined according to the actual needs of the user, effectively improving the scope of the device's application and the user's experience.

In some embodiments, the first contact information or the second contact information is fingerprint information. "The first determining unit configured to determine whether the captured first contact information matches the first preset contact information" includes the first determining unit configured to calculate a feature value of the first contact information captured by the sensing unit, and compare the feature value with the first preset contact information. When the error is less than the preset error, it is determined as a match, otherwise it is determined as a mismatch. In addition, "the second determining unit configured to determine whether the captured second contact information matches the second preset contact information" includes the second determining unit configured to calculate a feature value of the second contact information captured by the sensing unit, and compare the feature value with the second preset contact information. When the error is less than the preset error, it is determined as a match, otherwise it is determined as a mismatch. The comparison of fingerprint information can be compared by fingerprint recognition algorithm. The fingerprint recognition algorithm includes the steps of pre-processing the fingerprint image, data feature extraction, feature matching, and fingerprint recognition. It can be implemented with a variety of algorithms. These algorithms are mature existing technologies and have been applied to various encryption and decryption fields and are not be repeated here.

In some embodiments, the processing unit is further configured to generate a prompt message determine when the second determination unit determines that the first contact information does not match the first preset contact information, or the second contact information does not match the second preset contact information. The prompt information includes one or more of sound prompt information, image prompt information, light prompt information, and video prompt information. The sound prompt information includes voice prompt information prompting the user that "the currently captured contact information does not match the preset contact information". The image prompt information includes a pop-up prompt information prompting the user that "the currently captured contact information does not match the preset contact information". The video prompt information includes animated prompt information prompting to input the contact information again in the contact recognition area so that the sensing unit can capture the user's contact information. The light prompt information includes changing screen brightness or making the display emit different colors of light, etc.

In some embodiments, the device includes more than two touch surfaces. When the first touch surface and the second touch surface are in a folded state, one or more other touch surfaces are also folded between the first touch surface and the second touch surface. For example, the device further includes a third display panel. The third display panel includes a third touch surface. When the device is in the folded state, the third touch surface can be attached to the back (non-touch surface) of the first display panel, and the non-touch surface of the third display panel can be attached to the back (non-touch surface) of the second display panel, so that only two touch surfaces of the folding display as a whole are disposed outward. A case where the device includes more than three display panels is similar to the case where the device includes three display panels, and details are not described herein again. In short, it is only necessary to ensure that the two touch surfaces are arranged outward when the device is in a folded and using state.

In some embodiments, in order to save the cost of the device, the shape of the contact recognition area is rectangular, and the center of the rectangle is located at the center of the first touch surface. Correspondingly, the shape of the sensing unit is a rectangular thin film disposed under the contact recognition area. Of course, in other embodiments, the number of sensing units are also such as multiple, as long as the multiple sensing units are spliced into a size suitable for the contact recognition area and placed under the contact recognition area.

Figure 5:
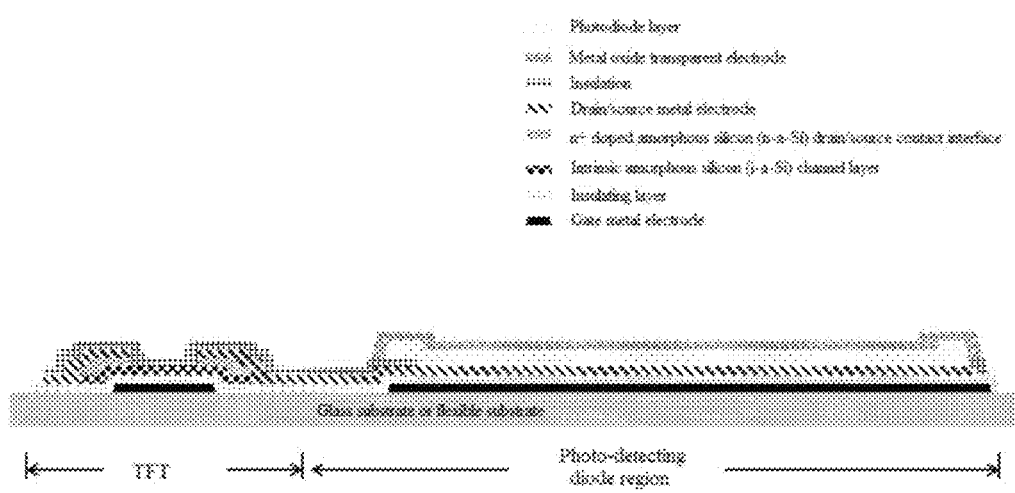
FIG. 5 is a schematic diagram of a sensing unit according to an embodiment of the present disclosure.

As shown in FIG. 5, in the present embodiment, the sensing unit includes a TFT image sensing array film, the light detection sensing layer comprises an array formed by photodiodes. An LCD panel or an OLED display panel is driven by a TFT structure to scan a single pixel to realize a display function of a pixel array on the panel. A main structure for forming a TFT switching function is an MOSFET, wherein well-known semiconductor layer materials mainly include amorphous silicon, polycrystalline silicon, IGZO, organic compounds mixed with nano carbon materials, etc. Since the structure of a photo-sensing diode can also be prepared from such semiconductor materials, and production equipment is also compatible with the production equipment of TFT arrays, a TFT photo-detecting diode has started to be produced by a TFT array preparation method in recent years. The TFT image sensing array film described in the present embodiment is the above-mentioned TFT photo-detecting diode (e.g., a photo-sensing diode region part in FIG. 5). A specific structure may refer to descriptions on the structure of the sensing unit in a U.S. Pat.

No. 6,943,070B2 and a PRC patent CN204808361U. A production process of the TFT image sensing array film is different from that of a TFT structure of the display panel in that an original pixel starting region of the display panel is changed to a photo-sensing in the production process. The TFT may be prepared by a method of using thin glass as a substrate or using a high temperature-resistant plastic material as the substrate, as described in the US patent U.S. Pat. No. 6,943,070B2.

The sensing unit shown in FIG. 5 is susceptible to the reflection and refraction of surrounding ambient light or visible light emitted by the pixels of the display screen and other factors, causing optical interference and seriously affecting the signal-to-noise ratio (SNR) of the TFT image sensing array film embedded under the display panel. In order to improve the SNR, a further improvement can be made on the sensing unit shown in FIG. 5, so that the TFT image sensing array film can detect the infrared signal of the user's feature information. In order that the first touch surface can still capture contact information in a dark environment, in some embodiments, the photodiode is an infrared photodiode, and the infrared photodiode includes an infrared sensing layer. The infrared sensing layer is configured to sense infrared signals, so that the sensing unit can also capture the user's contact information in a dark environment, thereby implementing an operation instruction on the device.

Figure 6:
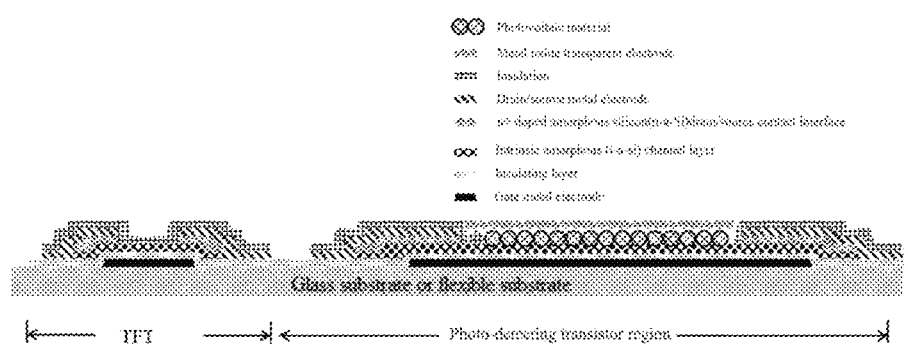
FIG. 6 is a schematic diagram of a sensing unit according to another embodiment of the present disclosure.

As shown in FIG. 6, in order to expand the wavelength of the optical signal that can be recognizable by the TFT image sensing array film from the visible light range to the infrared light range, it is necessary to improve the TFT image sensing array film shown in FIG. 5. The improvement is specifically to replace the photodiode layer of the TFT image sensing array film shown in FIG. 5 by using an infrared photodiode, and the infrared photodiode includes a microcrystalline silicon photodiode or an amorphous silicon compound photodiode.

In some embodiment, the amorphous silicon p-type/i-type/n-type photo diode structure (i.e., photodiode layer shown in FIG. 6) was changed to a microcrystalline silicon p-type/i-type/n-type photodiode structure. In this embodiment, the degree of micro-crystallization of the photodiode is mainly determined by mixing gaseous hydrogen silane (SiH4) with appropriate concentration of hydrogen to control the hydrogen bond to bind with the dangling bond of the amorphous silicon during the chemical vapor deposition process, so as to achieve the coating of microcrystalline silicon p-type/i-type/n-type photodiode structure. By adjusting the hydrogen concentration of chemical vapor deposition process, the operating wavelength range of the microcrystalline photodiode can be expanded to the light wavelength range of 600 nm to 1000 nm.

In the embodiment using the microcrystalline photodiode, in order to further improve the quantum efficiency of the photoelectric conversion, the microcrystalline silicon photodiode can also be formed by serially connecting double junction or multi junction p-type/i-type/n-type structures. The p-type/i-type/n-type material of the first junction layer of the photodiode is still an amorphous structure, and the p-type/i-type/n-type material of the second junction layer or the other junction layers may be a microcrystalline structure or a polycrystalline structure.

In some embodiment, the amorphous silicon p-type/i-type/n-type photodiode structure (photodiode layer in FIG. 5) is changed to a p-type/i-type/n-type photodiode structure doped with an amorphous silicon compound having an expandable photosensitive wavelength range. The amorphous silicon compound of a preferred embodiment is amorphous silicon germanium. In this embodiment, during the coating process of intrinsic layer (i type) of the photodiode by using chemical vapor deposition method, gas germane (GeH4) mixed with silane (SiH4) was introduced, so that the photosensitive range of the amorphous silicon germanium p-type/i type/n-type photodiode can reach a wavelength range of 600 nm to 1000 nm.

In the embodiment using the amorphous silicon compound photodiode, in order to improve the quantum efficiency of the photoelectric conversion, the amorphous silicon photodiode can also be formed by serially connecting double junction or multi junction p-type/i-type/n-type structures. The p-type/i-type/n-type material of the first junction layer of the photodiode is still an amorphous silicon structure, and the p-type/i-type/n-type material of the second junction layer or the other layers may be a microcrystalline structure, a polycrystalline structure, or a material doped with a compound having an expandable photosensitive wavelength range.

When the infrared sensing layer is an array formed by an infrared photosensitive diode, in actual application, a TFT is used for scanning, driving, and adding a bias voltage between the p-type/i-type/n-type photodiodes, which will make the infrared photodiode in the state of detecting the infrared light signal, realizing the function of TFT image sensing array film emitting infrared light.

In some embodiments, the first trigger signal may be triggered by applying a positive bias between the p-type/i-type/n-type infrared photodiode; and the second trigger signal may be triggered by applying a zero bias or a negative bias between the p-type/i-type/n-type infrared photodiode. For example, if the array formed by the infrared photodiode is assumed to have 10 columns (assuming the number is 1 to 10), then a positive bias is applied to odd-numbered pixel arrays so that the odd-numbered columns of pixel array can emit infrared light signals, and a zero bias or a negative bias is applied to even-numbered pixel arrays, so that the even-numbered columns of pixel arrays are in the infrared light detecting state, thus capturing the infrared light reflected from the location where the user's characteristic information is located and converting the infrared light into an infrared image for output. Of course, in some embodiments, the first trigger signal may be triggered by applying a zero bias or a negative bias between the p-type/i-type/n-type infrared photodiode; and the second trigger signal may be triggered by applying a positive bias between the p-type/i-type/n-type infrared photodiode.

In some embodiments, a positive bias and a zero bias or a negative bias may be alternately applied between the p-type/i-type/n-type infrared photodiode to trigger the first trigger signal or the second trigger signal. Similarly, an array formed by the infrared photodiodes with 10 columns of pixel arrays is taken as an example, during the first period, a positive bias is applied to the p-type/i-type/n-type infrared photodiode, so that the 10 columns of pixel arrays are all in an infrared light emitting state; during the second period, a zero bias or a negative bias is applied to the p-type/i-type/n-type infrared photodiode, so that the 10 columns of pixel arrays are all in the infrared light detecting state, which is used for capturing the infrared light information reflected from the location where the user's characteristic information is located and generating a corresponding infrared image output; during the third period, a positive bias is further applied to the p-type/i-type/n-type infrared photodiode, so that the 10 columns of pixel arrays are all in the infrared light emitting state; and repeatedly alternated in the same manner.

The light source trigger signal (first trigger signal) and the detection trigger signal (second trigger signal) are alternately switched in a preset frequency. The time interval between adjacent periods can be set according to the actual needs. In some embodiment, the time interval can be set as the time required for the TFT array to drive scanning each frame of infrared photodiode array to receive at least one frame of complete image signal, that is, the preset frequency is that the switch is performed every said time interval.

Figure 4:
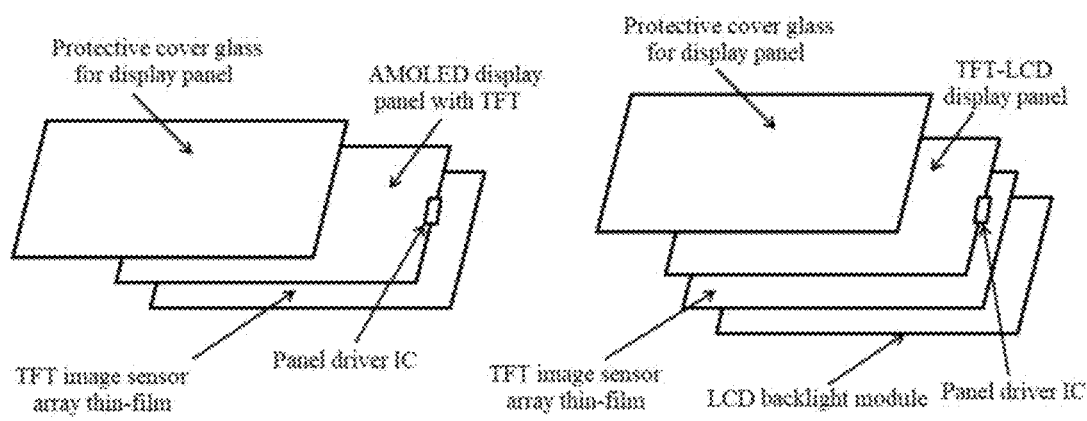
FIG. 4 is a schematic diagram of a contact recognition device of a folding display according to another embodiment of the present disclosure.

In some embodiments, The first display panel or the second display panel is a display panel using active array thin film transistors for scan driving and transmitting data. The display unit includes an AMOLED display, a liquid crystal display, a micro light emitting diode display, a quantum dot display, or an electronic ink display. As shown in FIG. 4, the first display panel is an liquid crystal display or an electronic ink display, a backlight unit 103 is disposed under the sensing unit, and the sensing unit is disposed between the backlight unit and the liquid crystal display, or disposed between the backlight unit and the electronic ink display. Since the liquid crystal display or the electronic ink display is not a self-illuminating component, the backlight unit needs to be added under the sensing units during installation. The backlight unit may be an LCD backlight module or other electronic components having a self-illuminating function. In some other embodiments, when the display unit is the AMOLED display or a micro light emitting diode display or a quantum dot display, the backlight unit is unnecessary to be provided due to the these display is a self-illuminating component. By setting the above two solutions, production requirements of different manufacturers can be effectively met; and an application range of the device is expanded.

In some embodiments, when the first display panel is an LCD liquid crystal display or an electronic ink display, the TFT image sensing array film includes an infrared sensing layer, and the infrared sensing layer is an array formed by infrared photodiodes or infrared phototransistors. The liquid crystal display or the electronic ink display screen is not a self-luminous element, so the TFT image sensing array film of FIG. 6 needs to be disposed in order to sense and recognize the contact information. For AMOLED displays or micro-light emitting diode displays or quantum dot displays, since these displays are self-luminous elements, the contact information can be detected and recognized using the sensing unit of FIG. 5 (such as fingerprint recognition functions). Of course, the structure of the sensing unit in FIG. 6 can also be used to improve the wavelength detection range of the sensing unit.

In some embodiments, the contact recognition area includes a plurality of contact recognition sub-areas, and a sensing unit is disposed corresponding to each of the contact recognition sub-areas. The device further includes an operation instruction receiving unit and a sensing unit control circuit. The operation instruction receiving unit is configured to receive an instruction of the user for starting the contact recognition sub-area. The sensing unit control circuit is configured to turn on the sensing unit under the contact recognition sub-area. In addition, the operation instruction receiving unit is also configured to receive another instruction of the user for closing the contact recognition sub-area, the sensing unit control circuit is configured to turn off the sensing unit under the contact recognition sub-area. The startup instruction can be triggered by the user turning on a power switch of the folding display, or it can be triggered by detecting that the current display is in the folded state.

Taking the number of contact recognition sub-areas as two as an example, the two contact recognition sub-areas are evenly distributed on the screen, one is up and one is down, or one is left and one is right, or distributed in the first touch surface in other arrangements. In the process of using, the sensing unit control circuit receives a start signal triggered by a user, and sets the light detection devices (ie, the sensing unit) under the two contact recognition sub-areas to an on state. In the preferred embodiment, the range of the two contact recognition sub-areas covers the entire first touch surface, such as a rectangular area with the screen as the center and a size of 2 cm×2 cm, so that when both light detection devices under contact recognition sub-areas are set to the on state, the light signal entering the contact recognition area can be captured by the TFT image sensing array film (i.e. light detection device) below, thereby capturing the user's contact information.

In other embodiments, the range of the two contact recognition sub-areas may also occupy ⅔, ¾, etc. of the entire display region. Of course, the user can also set one light detection device under some contact recognition sub-area to be turned on and the other light detection device under the other contact recognition sub-area to be turned off according to his or her preference. It is also possible to set both light detection devices under two contact recognition sub-areas to the off state when no operation is required on the device. In short, the light detection device under each contact recognition sub-area can be set to be turned on or off according to the user's own preferences.

Figure 1:
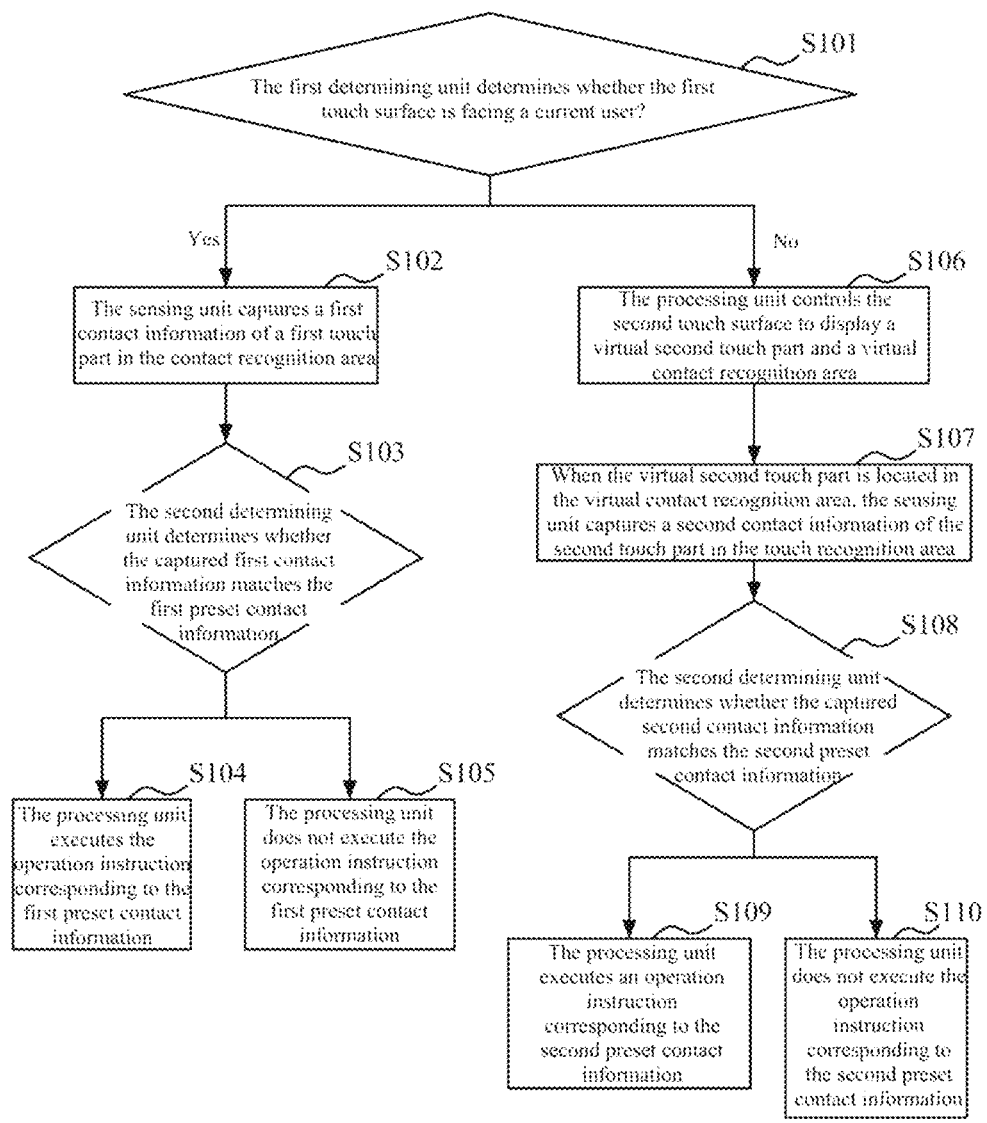
FIG. 1 is a flowchart of a contact recognition method of folding display according to an embodiment of the present disclosure.

As shown in FIG. 1, it is a flowchart of a contact recognition method of folding display according to an embodiment of the present disclosure. The method is applied to a contact recognition device of the folding display. The device includes a first display panel and a second display panel, the first display panel includes a first touch surface, and the second display panel includes a second touch surface. The first touch surface and the second touch surface are configured to switch between a folded state of being opposite to each other and an unfolded state. It is characterized in that a contact recognition area is provided on the first touch surface, a sensing unit is provided under the contact recognition area, and the sensing unit is configured to capture a user's contact information. The device comprises a contact information preset unit, a processing unit, and a determining unit; the determining unit includes a first determining unit and a second determining unit.

The contact information preset unit is configured to preset a correspondence relationship between a preset contact information and an operation instruction, and the preset contact information includes a first preset contact information and a second preset contact information. The first preset contact information is the contact information input by the first touch part and stored in the storage unit in advance, and the second preset contact information is the second contact information input by the second touch part and stored in the storage unit in advance.

When the first touch surface and the second touch surface are in a folded state, and the first touch surface and the second touch surface are disposed outward, the method further includes the following steps.

First a step S101 is performed. The first determining unit determines whether the first touch surface is facing a current user.

If it is determined that the first touch surface is facing the current user, a step S102 is performed the sensing unit captures a first contact information of a first touch part in the contact recognition area. After the step S102, a step S103 is performed the second determining unit determines whether the captured first contact information matches the first preset contact information, if it matches, a step S104 is performed the processing unit executes the operation instruction corresponding to the first preset contact information, if it does not match, a step S105 is performed the processing unit does not execute the operation instruction corresponding to the first preset contact information.

If it is determined that second touch surface is facing the current user, a step S106 is performed the processing unit controls the second touch surface to display a virtual second touch part and a virtual contact recognition area. A display position of the virtual contact recognition area on the second touch surface is corresponding to a display position of the contact recognition area on the first touch surface. A display position of the virtual second touch part on the second touch surface is corresponding to a current position of the second touch part on the first touch surface.

After the step S106, a step S107 is performed when the virtual second touch part is located in the virtual contact recognition area, the sensing unit captures a second contact information of the second touch part in the touch recognition area. After the step S107, a step S108 is performed the second determining unit determines whether the captured second contact information matches the second preset contact information, if it matches, a step S109 is performed the processing unit executes an operation instruction corresponding to the second preset contact information, if it does not match, a step S110 is performed the processing unit does not execute the operation instruction corresponding to the second preset contact information.

Figure 2:
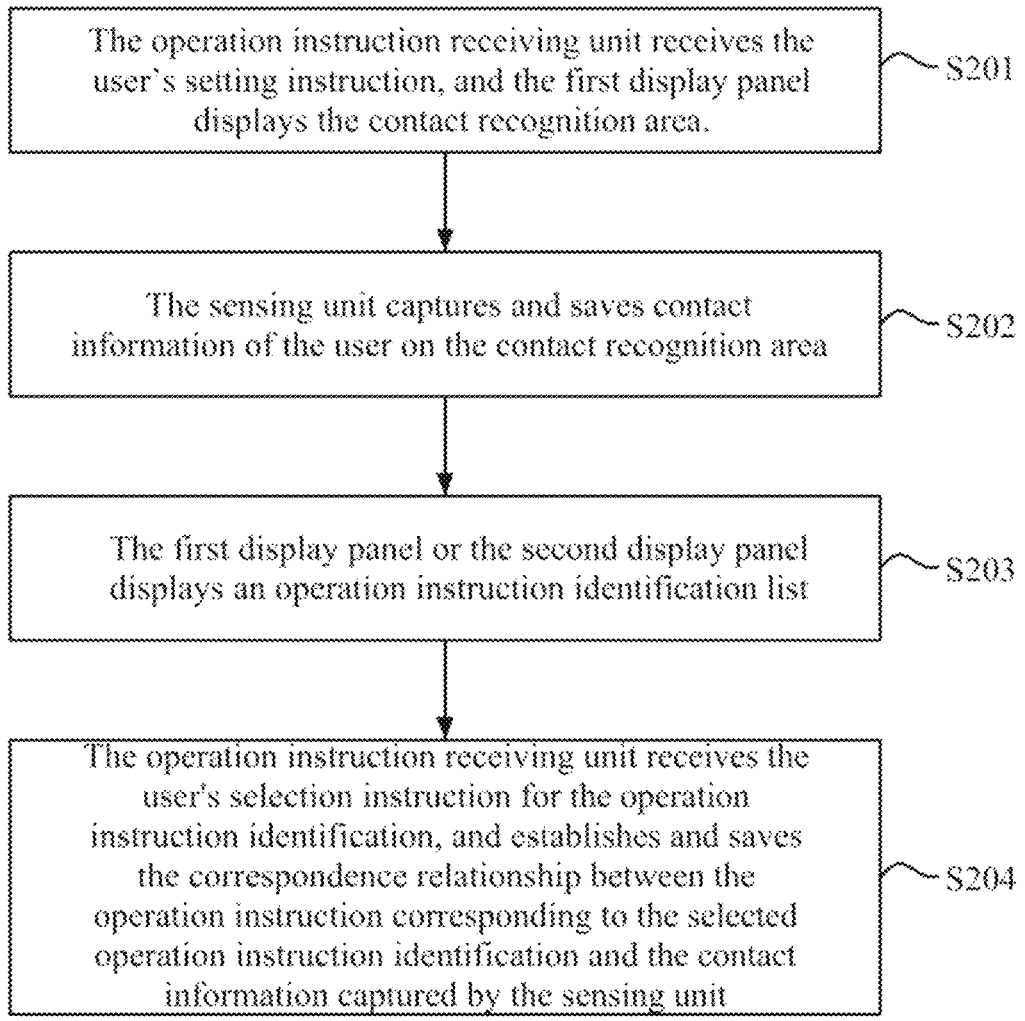
FIG. 2 is a flowchart of a contact recognition method of folding display according to another embodiment of the present disclosure.

As shown in FIG. 2, the device includes an operation instruction receiving unit. The step of the contact information preset unit configured to preset a correspondence relationship between a preset contact information and an operation instruction includes the following steps. First a step S201 is performed the operation instruction receiving unit receives the user's setting instruction, and the first display panel displays the contact recognition area. Then, a step S202 is performed the sensing unit captures and saves contact information of the user on the contact recognition area. Thereafter, a step S203 is performed the first display panel or the second display panel displays an operation instruction identification list. The operation instruction identification list includes one or more identifications corresponding to operation instructions, and each operation instruction identification corresponds to an operation instruction. Next, a step S204 is performed the operation instruction receiving unit receives selection instruction of the user for the operation instruction identification, and establishes and saves the correspondence relationship between the operation instruction corresponding to the selected operation instruction identification and the contact information captured by the sensing unit. The user can freely select the operation instruction corresponding to the contact information through the interactive interface, and complete the setting of the correspondence relationship between the contact information and the operation instruction, effectively improving the user's experience.

In some embodiment, the step of the first determining unit determining whether the first touch surface is facing a current user includes the first determining unit determining whether the current sensing unit has captured the user's feature information, and if yes, it is determined that the first touch surface faces the current user, otherwise it is determined that the second touch surface faces the current user. The feature information comprises one or more of face feature information, fingerprint feature information, human ear feature information, and lip feature information.

In some embodiment, the step of the first determining unit determining whether the first touch surface is facing the current user includes the first determining unit determining whether the ambient light intensity sensed by the current sensing unit is lower than a preset light intensity, and if yes, it is determined that the second touch surface is facing the current user, otherwise it is determined that the first touch surface is facing the current user.

In some embodiment, the step of the first determining unit determining whether the first touch surface is facing the current user includes the first determining unit determining whether the detected number of contacts on the first touch surface is greater than a preset number of contacts, and if yes, it is determined that the second touch surface is facing the current user, otherwise it is determined that the first touch surface is facing the current user. In some embodiment, the current number of contacts on the first touch surface is detected by the sensing unit or the touch panel of the first display panel.

In short, there are many ways in determining unit determining whether the first touch surface is facing the current user. Specifically, it can be determined according to the actual needs of users, effectively improving the scope of the device's applicable scenarios and the user's experience.

In some embodiment, the first contact information or the second contact information is fingerprint information. The step of the second determining unit determining whether the captured first contact information matches the first preset contact information includes the second determining unit calculating a feature value of the first contact information captured by the sensing unit, and comparing the feature value with the first preset contact information; when the error is less than a preset error, it is determined as a match, otherwise it is determined as a mismatch. In addition, the step of the second determining unit determining whether the captured second contact information matches the second preset contact information includes the second determining unit calculating a feature value of the second contact information captured by the sensing unit, and comparing the feature value with the second preset contact information; when the error is less than the preset error, it is determined as a match, otherwise it is determined as a mismatch.

In some embodiment, the method further includes the processing unit generating a prompt message when the second determination unit determines that the first contact information does not match the first preset contact information, or the second contact information does not match the second preset contact information. The prompt information includes one or more of sound prompt information, image prompt information, light prompt information, and video prompt information. In this way, when the contact information does not match the preset contact information, the user can know in time so as to input the contact information again, so that the terminal executes the corresponding operation instruction as soon as possible.

In some embodiment, the device includes more than two touch surfaces. When the first touch surface and the second touch surface are in the folded state, one or more other touch surfaces are also folded between the first touch surface and the second touch surface. For example, the device further includes a third display panel. The third display panel includes a third touch surface. When the device is in the folded state, the third touch surface can be attached to the back (non-touch surface) of the first display panel, and the non-touch surface of the third display panel can be attached to the back (non-touch surface) of the second display panel, so that only two touch surfaces of the folding display as a whole are disposed outward. A case where the device includes more than three display panels is similar to the case where the device includes three display panels, and details are not described herein again. In short, it is only necessary to ensure that the two touch surfaces are arranged outward when the device is in a folded and using state.

In some embodiment, the device includes an operation instruction receiving unit and a sensing unit control circuit, the method further includes the following steps. The operation instruction receiving unit receives an instruction of the user for starting the contact recognition sub-area, and the sensing unit control circuit turns on the sensing unit under the contact recognition sub-area. The operation instruction receiving unit receives another instruction of the user for closing the contact recognition sub-area, and the sensing unit control circuit turns off the sensing unit under the contact recognition sub-area. In short, the on or off of the light detection device under each contact recognition sub-area can be set according to the user's own preference.

The present disclosure provides a contact recognition method and device for a folding display. When the first touch surface and the second touch surface are in a folded state, if it is determined that the first touch surface faces the current user, since a sensing unit is provided under the first touch surface, the first touch surface can directly capture the first contact information of the user. When it is determined that the second touch surface is facing the current user, the processing unit projects the touch recognition area and the second touch part that is currently in contact with the first touch surface onto the second touch surface correspondingly, the user can move the second touch part so that the virtual second touch part on the second touch surface is within the virtual touch recognition area. In this way, the touch recognition area of the first touch surface which is facing away from the user can obtain the second contact information. The problems such as the inconvenience of multi-fingerprint fingerprint operation of the under-screen fingerprint recognition device after folding, folding mobile device with full-screen fingerprint recognition device leading to high installation cost, and poor user interaction experience are solved.

The above descriptions are only the embodiments of the present invention, and thus does not limit the patent protective scope of the present invention. Similarly, any equivalent structure or equivalent process transformation made by using the present specification and the drawings, or directly or indirectly applied to other relevant technical fields, shall be included in the patent protective scope of the present invention.

The invention claimed is:

1. A device for recognizing a contact on a folding display, the device comprising a first display panel and a second display panel, the first display panel comprising a first touch surface, and the second display panel comprising a second touch surface, the first touch surface and the second touch surface configured to switch between a folded state of being opposite to each other and an unfolded state, characterized in that, a contact recognition area is provided on the first touch surface, a sensing unit is provided under the contact recognition area, and the sensing unit is configured to capture a user's contact information; the device further comprises a contact information preset unit, a processing unit, and a first determining unit;

the contact information preset unit is configured to preset a correspondence relationship between a preset contact information and an operation instruction, and the preset contact information comprises a first preset contact information;

when the first touch surface and the second touch surface are in the folded state, and the first touch surface and the second touch surface are disposed outward, the first determining unit is configured to determine whether the first touch surface or the second touch surface is facing a current user;

if it is determined that the first touch surface is facing the current user, the sensing unit is configured to capture a first contact information of a first touch part in the contact recognition area; the first determining unit is configured to determine whether the captured first contact information matches the first preset contact information, if it matches, the processing unit is configured to execute the operation instruction corresponding to the first preset contact information, if it does not match, the processing unit does not execute the operation instruction corresponding to the first preset contact information;

if it is determined that second touch surface is facing the current user, the processing unit is configured to control the second touch surface to display a virtual second touch part and a virtual contact recognition area, a display position of the virtual contact recognition area on the second touch surface is corresponding to a display position of the contact recognition area on the first touch surface, a display position of the virtual second touch part on the second touch surface is corresponding to a current position of the first touch part on the first touch surface.

2. The device for recognizing a contact on a folding display according to claim 1, characterized in that, the determining unit further comprises a second determining unit, and the preset contact information further comprises a second preset contact information, when the virtual second touch part is located in the virtual contact recognition area, the sensing unit is configured to capture a second contact information of the second touch part in the touch recognition area, the second determining unit is configured to determine whether the captured second contact information matches the second preset contact information, if it matches, the processing unit is configured to execute an operation instruction corresponding to the second preset contact information, if it does not match, the processing unit does not execute the operation instruction corresponding to the second preset contact information.

3. The device for recognizing a contact on a folding display according to claim 1, characterized in that, the device further comprises an operation instruction receiving unit, and the contact information preset unit being configured to preset a correspondence relationship between a preset contact information and an operation instruction comprises:

the operation instruction receiving unit being configured to receive the user's setting instruction, and the first display panel being configured to display the contact recognition area;

the sensing unit being configured to capture and save contact information of the user on the contact recognition area;

the first display panel or the second display panel being configured to display an operation instruction identification list, the operation instruction identification list comprising one or more identifications corresponding to operation instructions, and each operation instruction identification corresponding to an operation instruction;

the operation instruction receiving unit being further configured to receive selection instruction of the user for the operation instruction identification, and establish and save the correspondence relationship between the operation instruction corresponding to the selected operation instruction identification and the contact information captured by the sensing unit.

4. The device for recognizing a contact on a folding display according to claim 1, characterized in that, the first determining unit being configured to determine whether the first touch surface or the second touch surface is facing a current user comprises:

the first determining unit being configured to determine whether the sensing unit has captured the user's feature information, and if yes, it is determined that the first touch surface faces the current user, otherwise it is determined that the second touch surface faces the current user.

5. The device for recognizing a contact on a folding display according to claim 1, characterized in that, the first determining unit being configured to determine whether the first touch surface or the second touch surface is facing the current user comprises the first determining unit configured to determine whether the ambient light intensity sensed by the current sensing unit is lower than a preset light intensity, and if yes, it is determined that the second touch surface is facing the current user, otherwise it is determined that the first touch surface is facing the current user.

6. The device for recognizing a contact on a folding display according to claim 1, characterized in that, the first determining unit configured to determine whether the first touch surface or the second touch surface is facing the current user comprises:

the first determining unit configured to determine whether the detected number of contacts on the first touch surface is greater than a preset number of contacts, and if yes, it is determined that the second touch surface is facing the current user, otherwise it is determined that the first touch surface is facing the current user.

7. The device for recognizing a contact on a folding display according to claim 6, characterized in that, the number of contacts on the first touch surface is detected by the sensing unit or the touch panel of the first display panel.

8. The device for recognizing a contact on a folding display according to claim 2, characterized in that, the first contact information or the second contact information is fingerprint information; the first determining unit being configured to determine whether the captured first contact information matches the first preset contact information comprises:

the first determining unit being configured to calculate a feature value of the first contact information captured by the sensing unit, and compare the feature value with the first preset contact information; when the error is less than a preset error, it is determined as a match, otherwise it is determined as a mismatch; and the second determining unit being configured to determine whether the captured second contact information matches the second preset contact information comprises the second determining unit configured to calculate a feature value of the second contact information captured by the sensing unit, and compare the feature value with the second preset contact information; when the error is less than the preset error, it is determined as a match, otherwise it is determined as a mismatch.

9. The device for recognizing a contact on a folding display according to claim 1, characterized in that, the device comprises more than two touch surfaces; when the first touch surface and the second touch surface are in the folded state, one or more other touch surfaces are folded between the first touch surface and the second touch surface.

10. The device for recognizing a contact on a folding display according to claim 1, characterized in that, the first display panel or the second display panel is a display panel using active array thin film transistors for scan driving and transmitting data, and comprises an AMOLED display, a liquid crystal display, a micro light emitting diode display, a quantum dot display, or an electronic ink display; when the first display panel is an LCD liquid crystal display or an electronic ink display, the TFT image sensing array film comprises an infrared sensing layer, and the infrared sensing layer is an array formed by infrared photodiodes or infrared phototransistors.

11. The device for recognizing a contact on a folding display according to claim 1, characterized in that, the contact recognition area comprises a plurality of contact recognition sub-areas, and a sensing unit is disposed corresponding to each of the contact recognition sub-areas.

12. The device for recognizing a contact on a folding display according to claim 11, characterized in that, the device further comprises an operation instruction receiving unit and a sensing unit control circuit, the operation instruction receiving unit is configured to receive an instruction of the user for starting the contact recognition sub-area, and the sensing unit control circuit is configured to turn on the sensing unit under the contact recognition sub-area; and the operation instruction receiving unit is configured to receive another instruction of the user for closing the contact recognition sub-area, the sensing unit control circuit is configured to turn off the sensing unit under the contact recognition sub-area.

13. A method for recognizing a contact on a folding display, the method applied to a contact recognition device of the folding display, the device comprising a first display panel and a second display panel, the first display panel comprising a first touch surface, and the second display panel comprising a second touch surface, the first touch surface and the second touch surface configured to switch between a folded state of being opposite to each other and an unfolded state, characterized in that, a contact recognition area is provided on the first touch surface, a sensing unit is provided under the contact recognition area, and the sensing unit is configured to capture a user's contact information; the device further comprises a contact information preset unit, a processing unit, and a first determining unit; the method comprises:

presetting, by the contact information preset unit, a correspondence relationship between a preset contact information and an operation instruction, wherein the preset contact information comprises a first preset contact information;

when the first touch surface and the second touch surface are in the folded state, and the first touch surface and the second touch surface are disposed outward, the method further comprises:

determining, by the first determining unit, whether the first touch surface or the second touch surface is facing a current user;

if it is determined that the first touch surface is facing the current user, the sensing unit captures a first contact information of a first touch part in the contact recognition area; the first determining unit determines whether the captured first contact information matches the first preset contact information, if it matches, the processing unit executes the operation instruction corresponding to the first preset contact information, if it does not match, the processing unit does not execute the operation instruction corresponding to the first preset contact information;

if it is determined that second touch surface is facing the current user, the processing unit controls the second touch surface to display a virtual second touch part and a virtual contact recognition area, a display position of the virtual contact recognition area on the second touch surface is corresponding to a display position of the contact recognition area on the first touch surface, a display position of the virtual second touch part on the second touch surface is corresponding to a current position of the first touch part on the first touch surface.

14. The method for recognizing a contact on a folding display according to claim 13, characterized in that, the determining unit further comprises a second determining unit, and the preset contact information further comprises a second preset contact information, when the virtual second touch part is located in the virtual contact recognition area, the sensing unit captures a second contact information of the second touch part in the touch recognition area, the second determining units determines whether the captured second contact information matches the second preset contact information, if it matches, the processing unit executes an operation instruction corresponding to the second preset contact information, if it does not match, the processing unit does not execute the operation instruction corresponding to the second preset contact information.

15. The method for recognizing a contact on a folding display according to claim 13, characterized in that, the device comprises an operation instruction receiving unit, and the contact information preset unit presetting a correspondence relationship between a preset contact information and an operation instruction comprises:
the operation instruction receiving unit receiving the user's setting instruction, and the first display panel displaying the contact recognition area;
the sensing unit capturing and saving contact information of the user on the contact recognition area;
the first display panel or the second display panel displaying an operation instruction identification list, the operation instruction identification list comprising one or more identifications corresponding to operation instructions, and each operation instruction identification corresponding to an operation instruction;
the operation instruction receiving unit further receiving the user's selection instruction for the operation instruction identification, and establishing and saving the correspondence relationship between the operation instruction corresponding to the selected operation instruction identification and the contact information captured by the sensing unit.

16. The method for recognizing a contact on a folding display according to claim 13, characterized in that, the first determining unit determining whether the first touch surface or the second touch surface is facing a current user comprises:
the first determining unit determining whether the sensing unit has captured the user's feature information, and if yes, it is determined that the first touch surface faces the current user, otherwise it is determined that the second touch surface faces the current user.

17. The method for recognizing a contact on a folding display according to claim 13, characterized in that, the first determining unit determining whether the first touch surface or the second touch surface is facing the current user comprises the first determining unit determining whether the ambient light intensity sensed by the current sensing unit is lower than a preset light intensity, and if yes, it is determined that the second touch surface is facing the current user, otherwise it is determined that the first touch surface is facing the current user.

18. The method for recognizing a contact on a folding display according to claim 13, characterized in that, the first determining unit determining whether the first touch surface or the second touch surface is facing the current user comprises the first determining unit determining whether the detected number of contacts on the first touch surface is greater than a preset number of contacts, and if yes, it is determined that the second touch surface is facing the current user, otherwise it is determined that the first touch surface is facing the current user.

19. The method for recognizing a contact on a folding display according to claim 18, characterized in that, the current number of contacts on the first touch surface is detected by the sensing unit or the touch panel of the first display panel.

20. The method for recognizing a contact on a folding display according to claim 13, characterized in that, the first contact information or the second contact information is fingerprint information; the first determining unit determining whether the captured first contact information matches the first preset contact information comprises:
the first determining unit calculating a feature value of the first contact information captured by the sensing unit, and comparing the feature value with the first preset contact information; when the error is less than a preset error, it is determined as a match, otherwise it is determined as a mismatch; and
the second determining unit determining whether the captured second contact information matches the second preset contact information comprises the second determining unit calculating a feature value of the second contact information captured by the sensing unit, and comparing the feature value with the second preset contact information; when the error is less than the preset error, it is determined as a match, otherwise it is determined as a mismatch.

21. The method for recognizing a contact on a folding display according to claim 13, characterized in that, the device comprises more than two touch surfaces; when the first touch surface and the second touch surface are in the folded state, one or more other touch surfaces are folded between the first touch surface and the second touch surface.

22. The method for recognizing a contact on a folding display according to claim 13, characterized in that, the contact recognition area comprises a plurality of contact recognition sub-areas, and a sensing unit is disposed corresponding to each of the contact recognition sub-areas.

23. The method for recognizing a contact on a folding display according to claim 22, characterized in that, the device further comprises an operation instruction receiving unit and a sensing unit control circuit, the method further comprises:
the operation instruction receiving unit receiving an instruction of the user for starting the contact recognition sub-area, and the sensing unit control circuit turning on the sensing unit under the contact recognition sub-area; and the operation instruction receiving unit receiving another instruction of the user for closing the contact recognition sub-area, and the sensing unit control circuit turning off the sensing unit under the contact recognition sub-area.

\* \* \* \* \*